United States Patent [19]

Arnaud

[11] Patent Number: 4,528,815

[45] Date of Patent: Jul. 16, 1985

[54] TURBOCHARGED INTERNAL COMBUSTION ENGINE HAVING MEANS FOR CONTROLLING SUPERCHARGING PRESSURE

[75] Inventor: Henri Arnaud, La Ferte-Alais, France

[73] Assignee: Regie Nationale des Usines Renault, Boulogne-Billancourt, France

[21] Appl. No.: 428,654

[22] Filed: Sep. 30, 1982

[30] Foreign Application Priority Data

Nov. 5, 1981 [FR] France ............................ 81 20766

[51] Int. Cl.³ ........................................ F02B 37/12
[52] U.S. Cl. ................................................... 60/600
[58] Field of Search ................. 60/600, 601, 602, 603, 60/611

[56] References Cited

U.S. PATENT DOCUMENTS 2,474,203  6/1949  Sparrow et al. ...................... 60/602
3,233,403  7/1963  McInnes et al. .
3,270,951  9/1966  Reed .................................... 60/602
4,222,240  2/1978  Castellano .

FOREIGN PATENT DOCUMENTS 52635   3/1982  Japan ..................................... 60/602
108413  7/1982  Japan ..................................... 60/602

Primary Examiner—Michael Koczo
Attorney, Agent, or Firm—Oblon, Fisher, Spivak, McClelland & Maier

[57] ABSTRACT

An apparatus for controlling the supercharging pressure in a turbocompressed engine, of the type including a turbocompressor the turbine portion of which is supplied through the exhaust pipe of the engine, with a shunted dump-valve, while the compressor portion supplies the engine's intake piping which is provided with a butterfly valve, and in which the dump-valve is controlled by a pneumatic actuating cylinder having a return spring for closing the actuator and a control chamber which is connected through a connection tube to either intake piping or to exhaust pipe, and a delay valve inserted within said connection tube, with the valve including a throttling constriction and a check valve set up in parallel.

7 Claims, 3 Drawing Figures

TURBOCHARGED INTERNAL COMBUSTION ENGINE HAVING MEANS FOR CONTROLLING SUPERCHARGING PRESSURE

BACKGROUND OF THE INVENTION

1. Field of the Invention

This invention relates to control of a dump-valve of turbocompressors.

2. Description of the Prior Art

It is known that heat engines supplied by turbocompressors always include a dump-valve bypassing the turbine side of the turbo-compressor so that the supply pressure to the engine will not increase indefinitely to a dangerous level.

To control this dump-valve, it is known to use a pneumatic actuator having a diaphragm, with a return spring acting to close the valve, and to cause the pressure collected at the outlet of the compressor portion to open the actuator, either upstream or downstream the butterfly valve, or at the level of the engine exhaust, above the turbine. This device has the advantage of being simple and prevents the intake pressure from reaching a point which will be harmful to the engine.

However, it is known that a turbocompressed engine can, under transitory conditions, tolerate supercharging much greater than that allowed under stabilized conditions. This is explained more particularly by the fact that the temperature of the surfaces in contact with the gasses in the engine is a priori lower at the beginning of acceleration than under equivalent stabilized conditions, and also by the improved cooling capacity of the heat exchanger. Other factors such as enrichment during acceleration, help to allow a temporary increase in the supercharging pressure limit. Therefore, it would be preferable in the simple device mentioned above to delay the moment at which the dump-valve comes into play during acceleration periods.

SUMMARY OF THE INVENTION

The invention consists of a device for controlling the supercharging pressure of a turbocompressed engine, of the type comprising a turbocompressor, the turbine portion of which is supplied through the exhaust pipe of the engine with a shunted dump-valve, while the compressor portion supplies the intake pipe of the engine equipped with a butterfly valve, and in which the dump-valve is controlled by a pneumatic actuator having a return spring acting to close the valve and whose control chamber is connected through a connection tube to one of said intake or exhaust pipes, characterized by the fact that a delay-valve is inserted in said connection tube and disposed in such a way as to severely restrict the flow of gasses but only in the direction proceeding from said pipe to the actuator chamber.

The safety of the engine is preferentially assured by an auxiliary dump-valve mounted in the intake circuit of the engine, downstream of the compressor, and activated by the pressure prevailing in the intake manifold, downstream of the butterfly valve. In a simplified version, the safety function is fulfilled by an automatic valve sensitive to the pressure prevailing at the site of its installation. In both cases, the dumped output is preferentially returned to the inlet of the compressor, having a favorable effect upon the response time of the turbocompressor.

The safety of the engine may also be assured by bypassing the delay valve entirely, with a safety valve controlled by another pneumatic actuator supplied with the pressure prevailing in the intake manifold downstream of the butterfly valve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
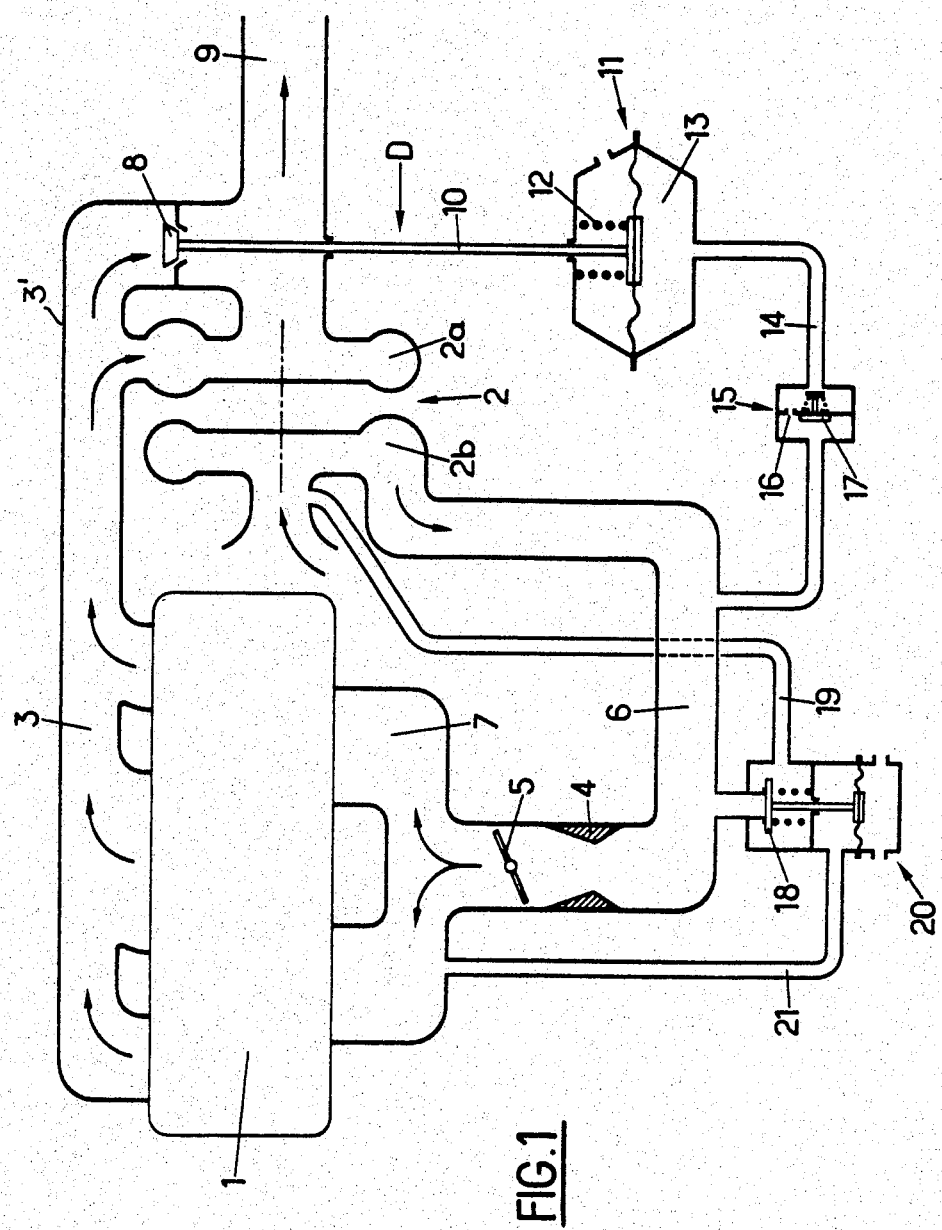
FIG. 1 shows schematically the preferred embodiment of the invention.

In FIG. 1 can be seen engine 1 equipped with a turbocompressor 2, the turbine portion 2a of which is fed through exhaust manifold 3 of the engine, while the compressor portion 2b takes in outside air and feeds the conventional venturi-equipped means 4 and butterfly valve 5 through an intake pipe 6. The butterfly valve thus regulates the air flow admitted to intake manifold 7.

In conventional fashion, the device comprises a dump-valve D allowing a greater or lesser fraction of the exhaust gas proceeding from exhaust manifold 3 to pass directly into exhaust pipe 9 without passing through turbine portion 2a. This valve D comprises a valve 8 located in turbine bypass passage 3' integral with a rod 10 driven by a pneumatic actuator, generally of the type having a diaphragm with a compartment opening to the atmosphere and containing a spring 12, said compartment acting to close valve 8, and a chamber 13 linked through a tube 14 to pipe 6 connecting the outlet of compressor 2b to venturi 4.

According to the teachings of the invention and for the reasons mentioned above, a delay-valve 15 is inserted within tube 14, consisting of a throttling constriction 16 arranged in parallel with a check valve 17 or an equivalent arrangement. This check valve or the equivalent are placed in such a way as to severely restrict the flow of gasses, but only in the direction proceeding from pipe 6 to actuator 11.

It will therefore be easily understood that during acceleration, this delay-valve 15 delays the filling of chamber 13 of actuator 11 and consequently delays the opening of dump-valve 8 so as to allow the maximum supercharging pressure permitted under stabilized conditions to be temporarily exceeded, making acceleration easier without changing the ultimate pressure in chamber 13 or the permanent adjustment of valve 8.

As an alternate embodiment, and as is known, chamber 13 of actuator 11 can be connected through tube 14, not to pipe 6, but rather to intake manifold 7, or to exhaust manifold 3 of the engine, upstream of turbine portion 2a.

An auxiliary dump-valve 18 is further provided, placed in a dump circuit 19 connecting engine feed pipe 6 located below the compressor and above butterfly valve 5 to, preferentially, the conduit located upstream of the compressor or, failing this, to atmosphere. This auxiliary valve 18 is activated by an auxiliary pneumatic actuator 20 with a calibrated spring 25, the control chamber 24 of which is connected through tubing 21 to intake manifold 7, downstream of butterfly valve 5.

If the actual pressure in intake manifold 7 reaches a point harmful to the engine, auxiliary dump-valve 18 opens under the effect of auxiliary pneumatic actuator 20, which is calibrated to a value higher than that of actuator 11, thus limiting the supercharging pressure, taking into account consequently the fact that butterfly valve 5 may be more or less closed. Compared to a discharge into the atmosphere, the discharge of intake pipe 6 into the inlet of compressor portion 2b makes it possible to recover part of the compression energy. This safety device makes it possible to derive maximum benefit from the temporary supercharging effect engendered by the delay means, with no risk to the motor because of its quickness of response. On the other hand, it has the advantage of not affecting the overall rotation speed of the turbocompressor, nor consequently the beneficial effect on the acceleration response time obtained from delay valve 15.

Therefore the assembly according to the teachings of the invention remains relatively simple and inexpensive, while greatly improving the dynamic response of the engine.

Figure 2:
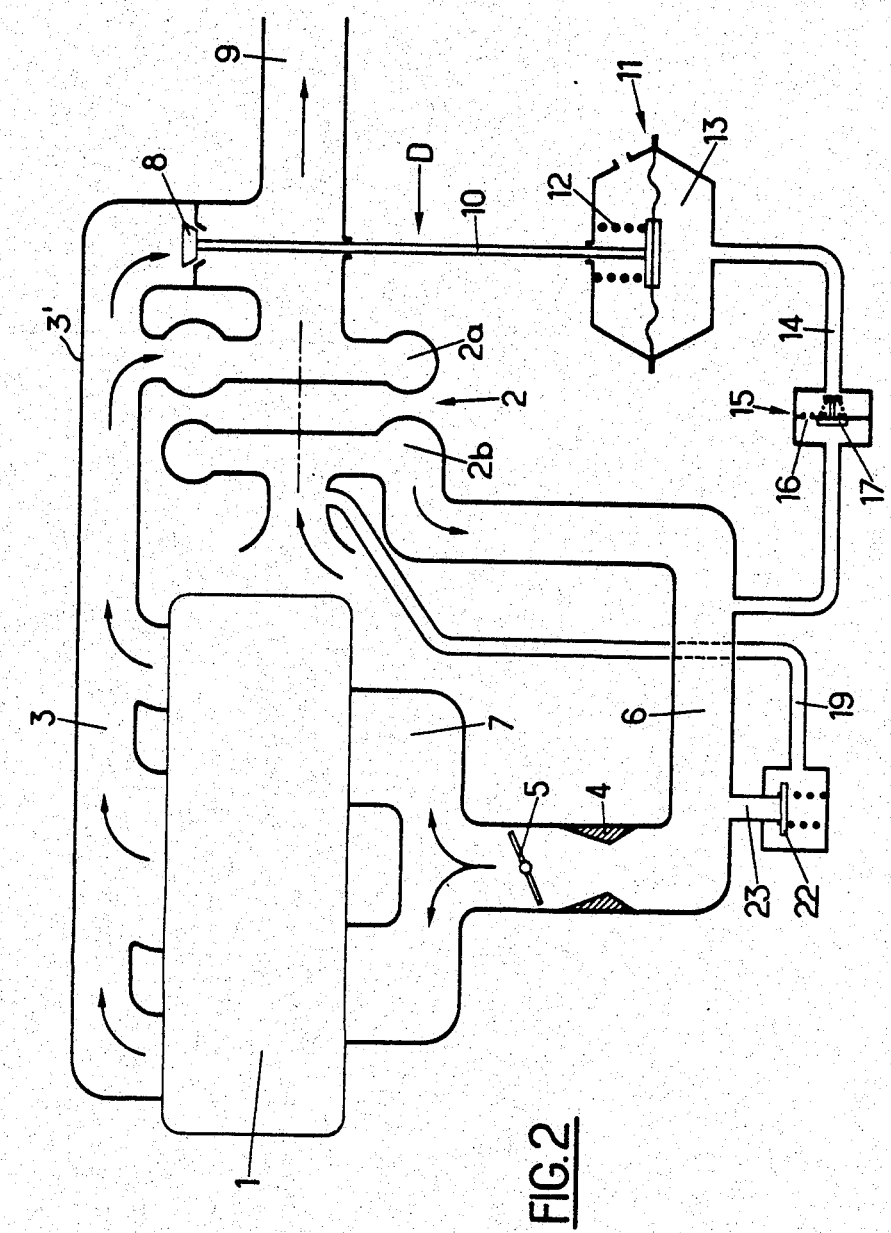
FIG. 2 shows a simplified second embodiment of the present invention.

An alternate embodiment of the invention is schematically illustrated in FIG. 2. It differs from the first in that the safety device is simplified. In this case, discharge is controlled by an automatic valve 22 whose opening depends directly on the pressure at outlet 23 of dump conduit 19 into the intake manifold. For certain applications, in particular when fuel is metered through an injection system, outlet 23 of dump conduit 19 may be placed within the intake manifold 7 of the engine downstream of butterfly valve 5, without modifying the richness of the mixture. One is then practically back to the previous arrangement.

Figure 3:
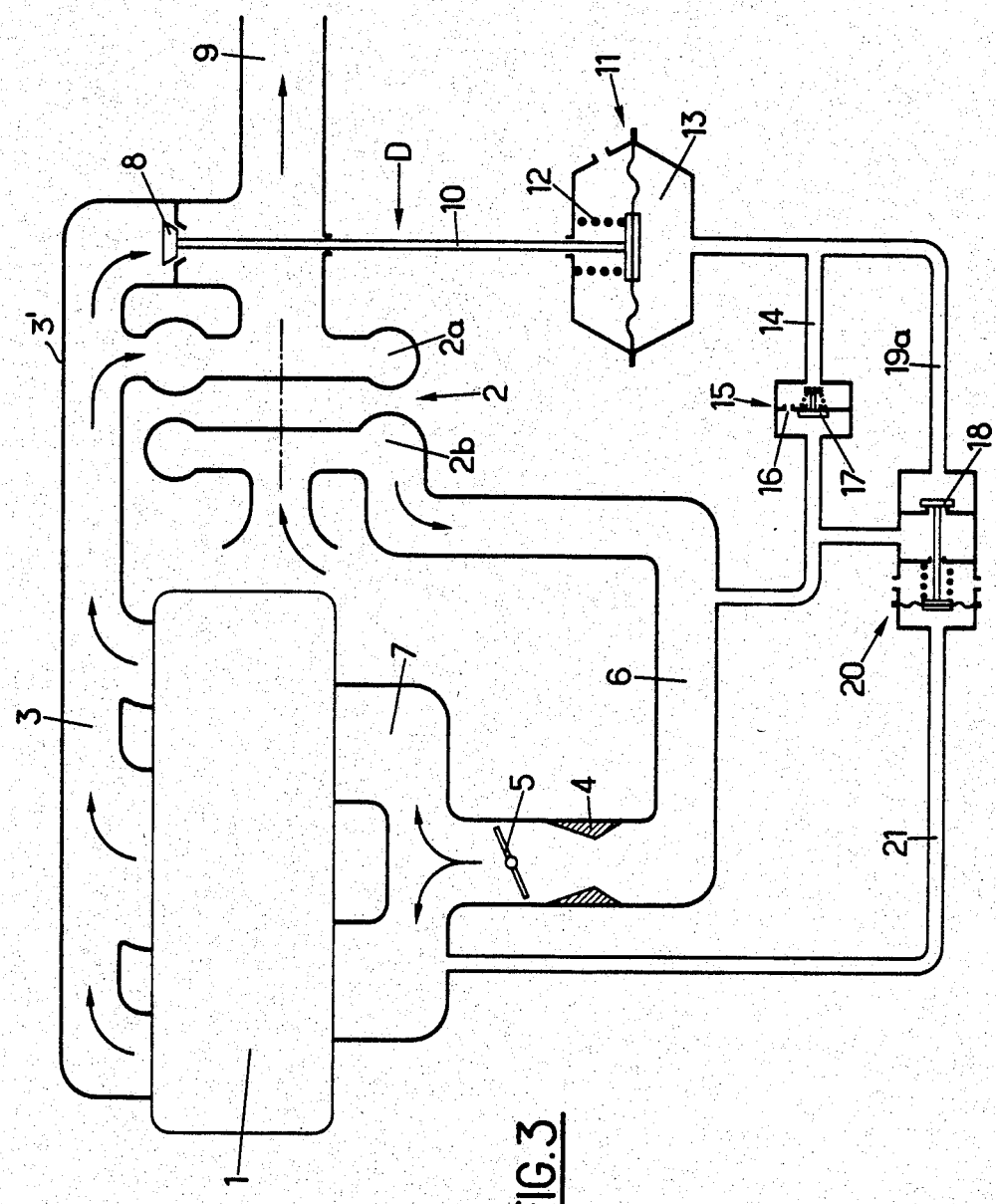
FIG. 3 shows a third embodiment of the present invention.

Another embodiment of the invention, likewise differing in the design of the safety means, is shown in FIG. 3. In this case, an auxiliary dump-valve 18 is provided, located in conduit 19a parallel to delay valve 15, with said auxiliary valve 18 itself being controlled by a auxiliary pneumatic actuator 20 having a calibrated spring whose control chamber is connected through tubing 21 to intake manifold 7, downstream of butterfly valve 5.

This safety device thus activates main pneumatic actuator 11 in the direction of discharge by bypassing delay valve 15, but only if the real pressure in intake manifold 7 threatens to become harmful to the engine, taking account, as in the case shown in FIG. 1, of the fact that butterfly valve 5 may be more or less partially closed.

Obviously, numerous modifications and variations of the present invention are possible in light of the above teachings. It is therefore to be understood that within the scope of the appended claims, the invention may be practiced otherwise than as specifically described herein.

I claim:

1. An apparatus for controlling the supercharging pressure in a turbocompressed engine of the type including an exhaust pipe, an engine intake manifold having a butterfly valve located therein and a turbocompressor, the turbine of which is supplied through the exhaust pipe of the engine, while the compressor thereof supplies the engine intake manifold and which is provided with said butterfly valve and a turbine bypass passage, comprising:
   a dump-valve comprising a first valve positioned in said turbine bypass passage for controlling flow through said bypass passage;
   a connection tube having one end thereof connected to said dump-valve; and
   a pneumatic actuator connected to said first valve and said connection tube for controlling said dump-valve, said actuator having a return spring disposed therein for closing said first valve and a chamber located therein which is connected via said connection tube with said intake manifold; and
   delay valve means disposed in said connection tube for restricting the flow of gases solely in a direction proceeding from said intake manifold to said chamber so as to control the pressure in said chamber of said actuator.

2. An apparatus as set forth in claim 1, further comprising:
   an auxiliary actuator having a calibrated spring disposed therein, a control chamber and an auxiliary dump-valve;
   tubing means interconnecting said control chamber of said auxiliary actuator to said intake manifold at a point downstream of said butterfly valve so as to form a bypass passage which bypasses said butterfly valve; and
   conduit means connecting a delivery side portion of said compressor with said auxiliary pneumatic actuator
   such that pressure increases in the intake manifold which exceed a predetermined point cause said auxiliary dump valve to open and to communicate said compressor with said tubing means.

3. An apparatus as set forth in claim 1, further comprising:
   a conduit in communication with a delivery side of said compressor; and
   auxiliary dump valve means disposed in said conduit such that pressure in said conduit directly causes the auxiliary dump valve means to open when said pressure exceeds a predetermined threshold value.

4. An apparatus as set forth in claim 2, wherein said conduit further comprises an entrance portion located upstream of said compressor and an exit portion located downstream of the compressor.

5. An apparatus as set forth in claim 3, wherein the conduit further comprises an entrance portion located upstream of said compressor and an exit portion located downstream of said compressor.

6. An apparatus as set forth in claim 1, further comprising:
   an auxiliary dump valve connected in parallel with said delay valve means and an auxiliary pneumatic actuator for controlling said auxiliary dump valve and having a calibrated spring disposed therein and a control chamber formed therein, and means for connecting the chamber of said auxiliary pneumatic actuator to said intake manifold at a position downstream of the butterfly valve so that pressure increases in the intake manifold which exceed a predetermined level cause said auxiliary dump valve to open.

7. An apparatus according to claim 1, wherein said delay valve means further comprises throttling constriction means and check valve means which are connected in parallel with respect to said connecting tube.

* * * * *